(12) United States Patent
Flynn

(10) Patent No.: US 6,298,947 B1
(45) Date of Patent: Oct. 9, 2001

(54) ENGINE OIL CLEANING SYSTEM

(76) Inventor: Robert E. Flynn, 953 N. Greer Ave., Covina, CA (US) 91724

( * ) Notice: Subject to any disclaimer, the term of this patent is extended or adjusted under 35 U.S.C. 154(b) by 0 days.

(21) Appl. No.: 09/699,118

(22) Filed: Oct. 27, 2000

(51) Int. Cl.[7] .............................. F16N 33/00; B08B 9/00
(52) U.S. Cl. .................. 184/1.5; 134/95.2; 134/111; 134/169 A; 141/85
(58) Field of Search ........................ 134/95.2, 111, 134/169 A; 184/1.5; 141/85; 123/198 A

(56) References Cited

U.S. PATENT DOCUMENTS

| | | |
|---|---|---|
| 1,549,952 * | 8/1925 | Anderson ................... 134/169 A |
| 2,454,585 * | 11/1948 | Alderman . |
| 2,554,389 * | 5/1951 | Stevens . |
| 2,665,772 | 1/1954 | Greer et al. . |
| 4,787,348 * | 11/1988 | Taylor ........................ 134/169 X |
| 5,460,656 | 10/1995 | Waelput et al. . |
| 5,566,781 * | 10/1996 | Robert et al. ............... 134/169 X |
| 5,833,765 * | 11/1998 | Flynn et al. ................ 134/169 X |

* cited by examiner

Primary Examiner—Philip R. Coe
(74) Attorney, Agent, or Firm—Boniard I. Brown

(57) ABSTRACT

An engine cleaning system has a cleaning solution container having a filter element therein and is adapted to establish a predetermined quantity of solution for a particular engine. Solution is pumped from the solution container to the engine interior by the engine oil pump, and a solution drain line connects the engine interior and the solution container. Oil and cleaning solution are pumped by the engine oil pump continuously during the cleaning process. The solution container has a removable closure for filter replacement and a drain valve for solution and oil.

20 Claims, 4 Drawing Sheets

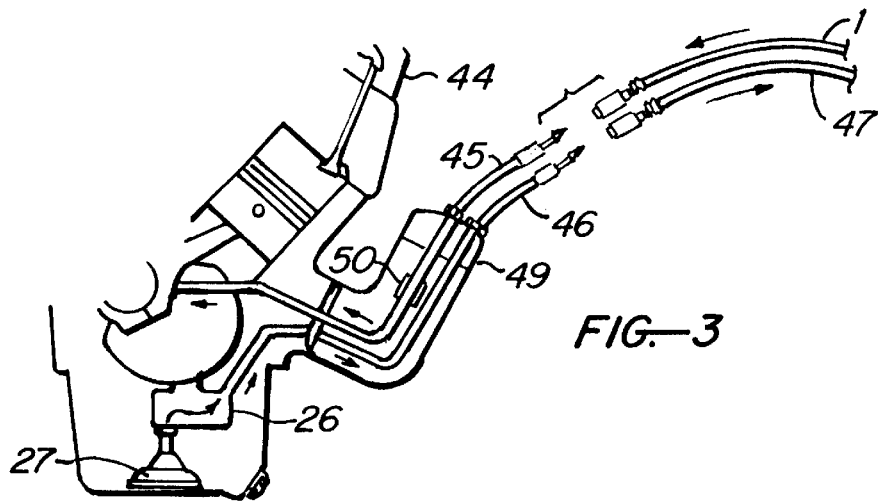
FIG.—3
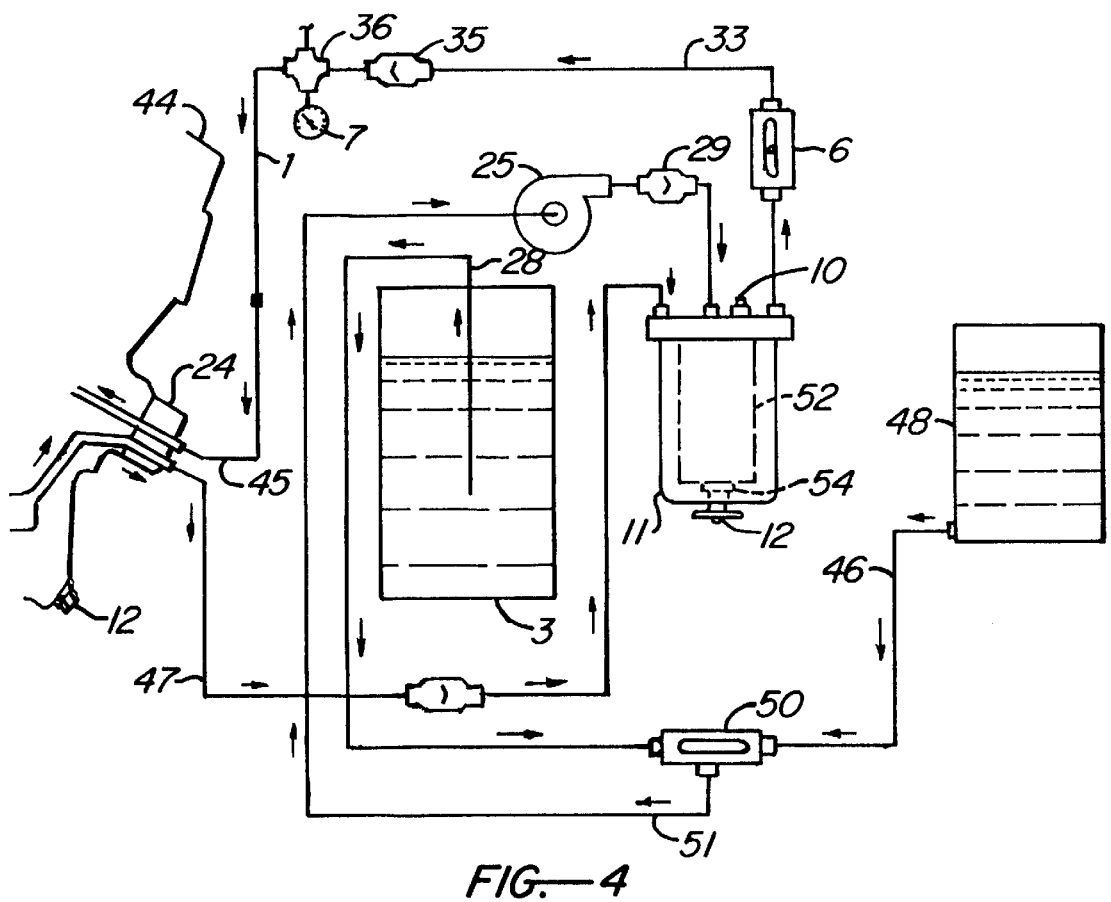
FIG.—4

ENGINE OIL CLEANING SYSTEM

BACKGROUND AND SUMMARY OF THE INVENTION

Engine cleaning systems and engine flushing procedures have long been known, and provide benefits including extended engine life, emissions reduction, and fewer repairs. The prior art procedures generally begin with draining used oil from an engine via apparatus attached to an engine drain plug opening or oil filter port, and pumping cleaning solution via an oil filter port to flush internal engine components. Solution and oil are drained via the engine drain plug opening. The processes have generally been performed with the engine not running, and employ a remote pump to move the cleaning solution through an engine. The cleaning solution has typically been re-used many times with its effectiveness being reduced with each re-use, so that after many cleanings with the same re-used solution, later-cleaned engines are relatively dirty.

The invention overcomes shortcomings and problems of the prior art. With the engine running during cleaning, all internal surfaces which are wetted with oil during engine operation are cleaned, including such components as valve covers. All surfaces, pressurized and non-pressurized are cleaned, whereas with prior methods only pressurized surfaces are cleaned. A cleaning solution container with a filter element therein provides a predetermined quantity of cleaning solution for a particular engine. Solution is pumped from a solution container to the engine interior, and a drain line connects the engine interior with the solution container. Cleaning solution and oil are pumped by the engine oil pump continuously during the cleaning process. The solution container is easily opened for replacement of filter elements, and has drainage means for used oil and solution. The solution container, valves, the fluid lines, and controls for operating the system, are preferably provided on an operating console.

BRIEF DESCRIPTION OF THE DRAWINGS

FIG. 1A is an exploded perspective view of an adapter assembly for an engine oil opening, utilized with the present invention;

FIG. 3 is a partial view of an adapter utilized with the invention mounted in an oil intake opening of the engine;

FIG. 4 is a schematic diagram of a modified form of the present invention;

DESCRIPTION OF THE PREFERRED EMBODIMENT

Figure 1:
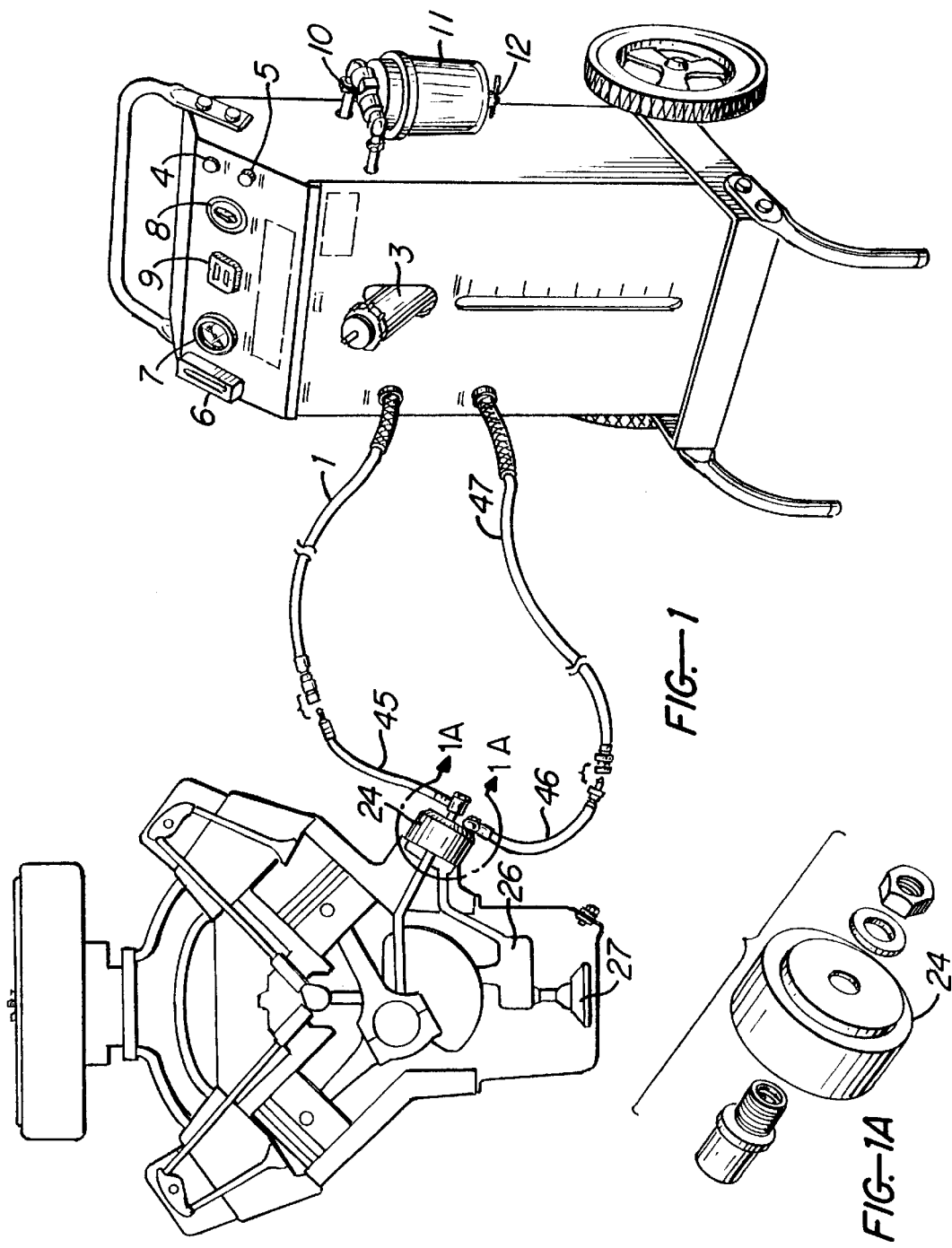
FIG. 1 is a perspective view of an operating console utilized with the present invention.

Referring to the drawings, a preferred embodiment of the present invention is shown as comprising a reservoir 3 for cleaning solution, a line for cleaning solution drawn by an engine oil pump 26 through a one-way valve 29 by a flow line 30, and thence to a filter container or bowl 11. According to the invention, an engine is cleaned in a dynamic mode with the engine running. Cleaning solution mixed with the used motor oil in the engine is circulated through the engine, thus to reach and clean all surfaces contacted by the engine lubricating system in the operation of the engine.

Preparatory to the cleaning operation, an engine oil filter of the engine to be cleaned is removed and an adapter 24 is threadedly mounted in the threaded oil filter opening.

Figure 2:
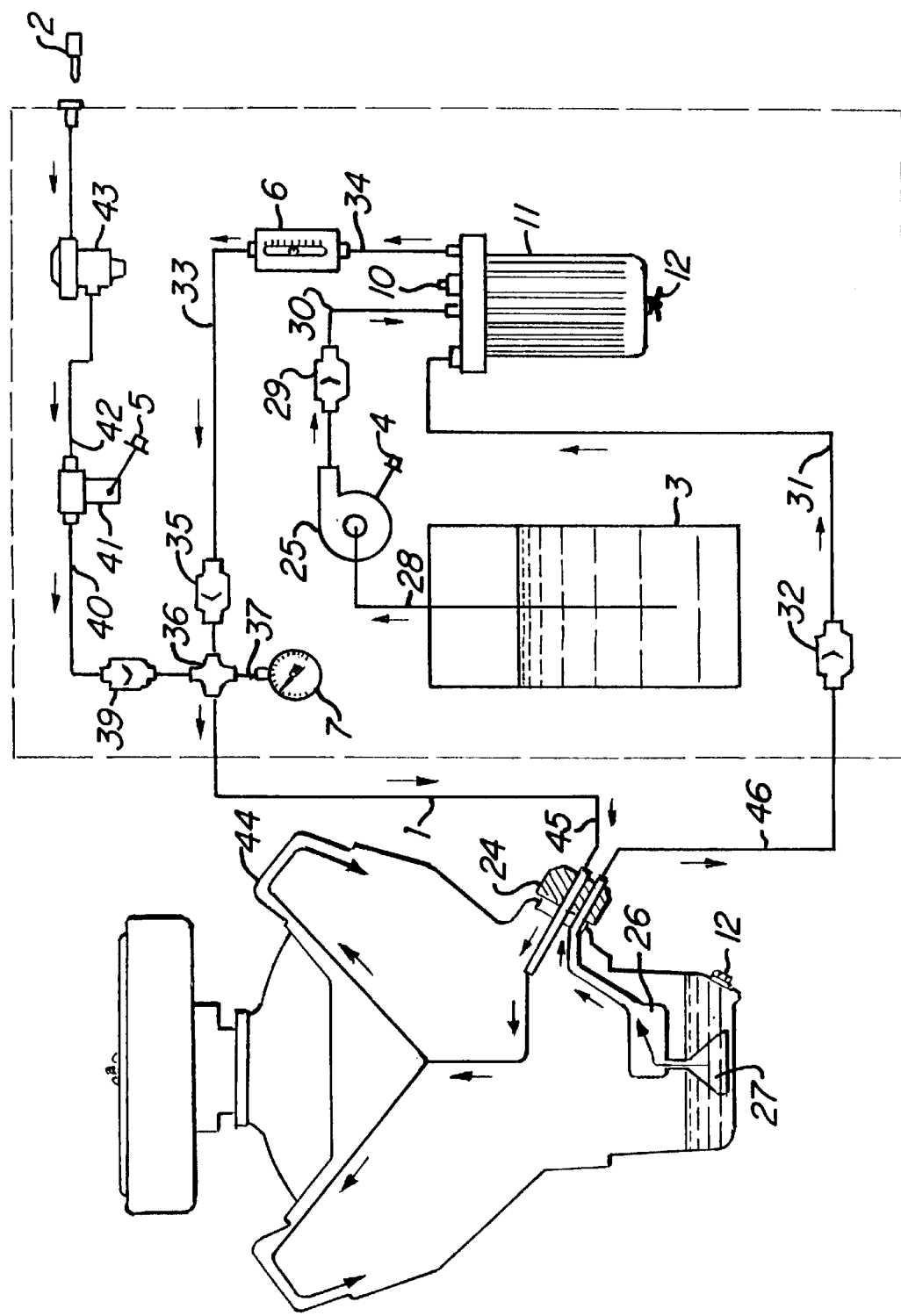
FIG. 2 is a schematic drawing of an engine oil cleaning system according to the invention.
Figure 6:
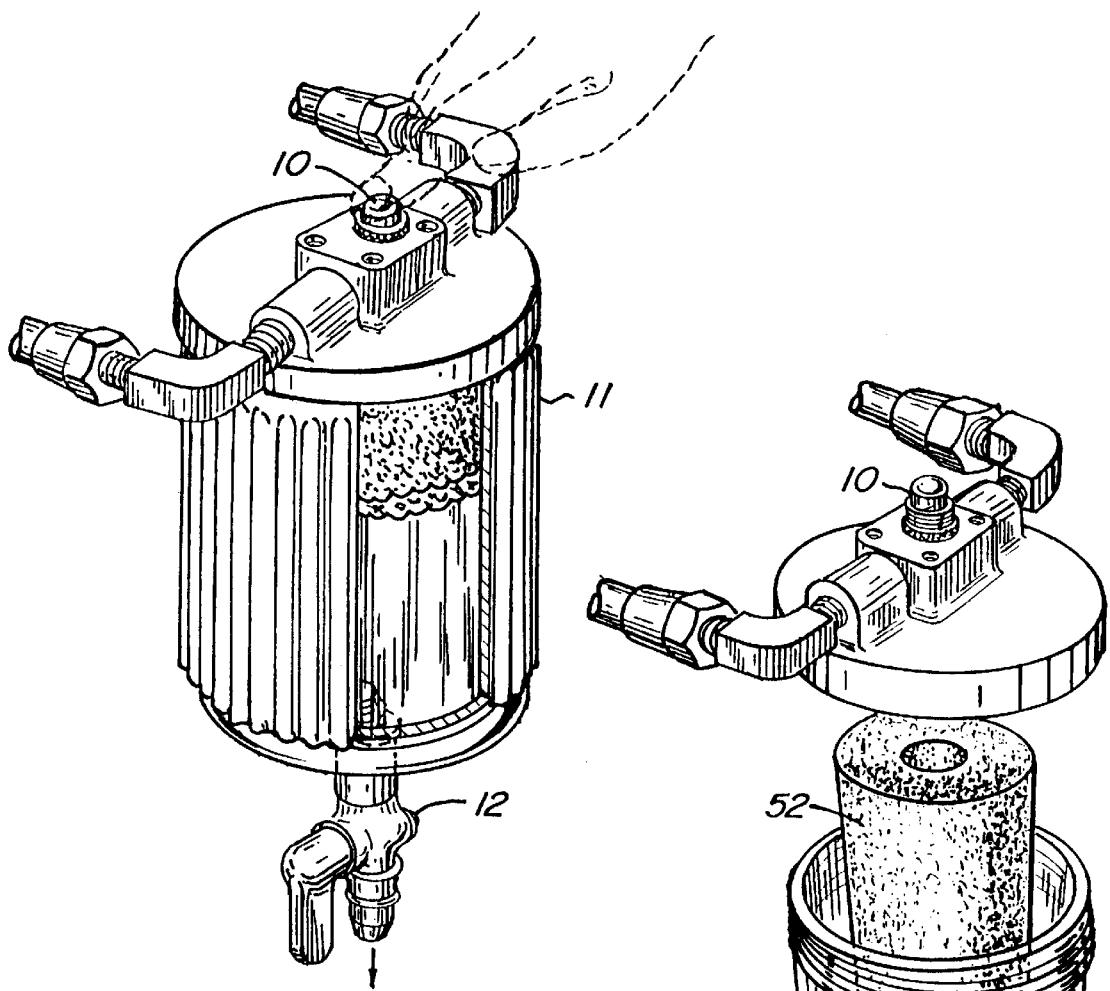
FIG. 6 is a perspective view of the cleaning solution container of FIG. 5.
Figure 5:
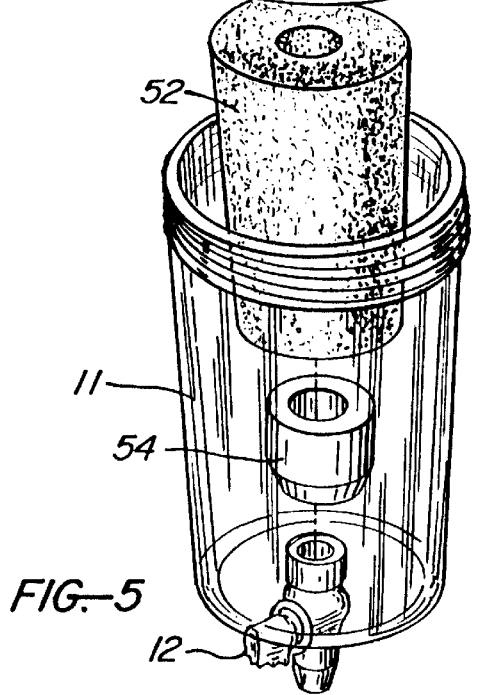
FIG. 5 is an exploded perspective view of a cleaning solution container assembly utilized with the invention.

Some engines utilize a canister-type adapter to be fitted into an oil filter housing. Referring to FIGS. 2 and 3, adapter 24 or 49 has two passages, one for inflow of cleaning solution to an engine interior, and the other for the outflow of the cleaning solution. Canister-type oil filter adapters are provided in a variety of openings and thread sizes. Adapters may be provided in a variety of thread sizes, and are typically color-coded to indicate respective openings and thread sizes of various automobile manufacturers.

In contrast with many prior art cleaning systems, wherein used or dirty engine oil is removed prior to cleaning operations, according to the invention, the used engine oil is preferably not drained prior to a cleaning operation.

The engine oil pump is utilized to pump oil and cleaning solution mixture throughout the engine, thus eliminating any need for a remote-mounted separate pump, as required in many prior systems.

With the engine running, engine oil passes via the filter bowl or container and concentrated cleaning solution, typically a detergent, mixes with the oil, typically at a ratio of 10 parts of used oil to 1 part cleaning solution. The oil and cleaning solution mixture is forced into the engine via line 33, approximately 32 oz. of solution having been pumped from the reservoir 3 to the filter container or bowl to substantially fill the bowl. A one-way check valve 32 prevents back-flow during filling of the bowl.

With the engine running, engine oil and cleaning solution are circulated throughout the engine about three or four times per minute for an average engine. Rotating and moving engine components effect a churning action to dissolve sludge, tar and varnish adhering to interior components. Heavier contaminants such as wear-metals particles and gasket particles are flushed into the engine oil pan, picked up by the engine oil pump and deposited in the engine oil filter. A typical cleaning cycle is about ten minutes, although heavily sludged engines and diesel engines may require longer cleaning times. A timer device 8 signals the completion of the cleaning period which is typically about ten minutes.

Diagnostic indications are provided regarding engine oil pump condition and any clogging condition of the engine oil pick-up screen. The flow meter 6 indicates the volume of solution pumped by the engine oil pump, and indicates diagnostically the relative cleanliness or clogging condition of oil pump 26 and engine oil pick-up screen. Pressure gauge 7 indicates the pressure produced by the engine, and provides diagnostic indication of any engine oil filter clogging. This gauge also indicates the oil pressure prior to and after an engine cleaning operation to indicate the effectiveness of the cleaning operation.

The solution container or bowl 11 and its associate components comprise important features of the present invention. During an engine cleaning operation, a filter screen (not shown) in a solution bowl intake passage from line 31 from the engine, removes any chips or fragments from the liquid oil and cleaning solution. The solution container may be provided with a scale or graduations to facilitate the transfer of a precise amount of cleaning solution to the filter bowl, in accordance with the oil pan capacity of a particular engine being cleaned.

A valve or petcock 12 mounted at the lower portion of the container is operable for the draining of the container of used, dirty oil and solution. A "siphon breaker" or air valve 10 is manually operable to admit air to the container to prevent a partial vacuum from interfering with draining of the container. This valve is preferably held open until the level of the container is about one-third below the top of the container. After draining the container bowl, the cap is removed from threaded engagement with the container, a used, dirty filter element 52 is removed and a new filter element is positioned in the container with minimum spillage because the container has already been drained.

Filter bowls are available in different sizes for engines of different sizes. Typically such containers or bowls are of similar diameters, but differ in length. A 5' bowl can typically be used with an engine oil capacity of about 4–5 quarts, and a 10' bowl for small diesel engines with oil capacity of about 10 quarts, and a 20' bowl for large diesel engines with bowl capacities over 20 quarts.

The filter containers or bowls are generally of the same diameter, and are provided in different lengths to accommodate various filter elements. Respective suppliers of cleaning solutions prescribe filter cartridges or elements of particular lengths for use with their respective solutions. An appropriate spacer 54 is utilized for a particular filter cartridge element to reconcile the cartridge or filter dimension with a container length, as shown.

Following a cleaning operation, and the draining of the engine oil and solution, air flushing is preferably utilized to remove any residual oil and solution from the engine. The air flush purges dirty oil and solution from the engine to exit via the drain plug. In some cases it may be desirable to leave a small amount of cleaning solution in the engine for the reason that it contains a seal-rejuvenator and oil conditioner. One end of an air line 42 is connected with an inlet port of a solenoid valve 41 (FIG. 2) and the other end is connected with a pressure regulator 43. Air flushing is initiated by pressing a button 5, typically at a console, to pump air via a nozzle 2, pressure regulator 43, air lines 42 and 40, a one-way check valve 39 and line 1 to pressurize the engine to remove left-over residual solution and oil.

A control console (FIG. 1) is preferably utilized for efficiency and convenience in the operation of the cleaning system. Mounted in or on the console are a number of controls and components earlier described. These include an on-off switch to control the filling of the cleaning solution container 11 which is mounted on the console for ease of viewing, particularly during filling of the container. The components associated with the solution input line 1 of the engine and components associated with the exit line 31 from the engine to the solution container are disposed in the console. Flow meter 6, on the console, indicates flow of cleaning solution and oil, and provides the diagnostic indication, earlier mentioned, to indicate any clogging of the pump pick-up screen 27. An oil pressure gauge 7 on the console indicates the oil pressure and provides diagnostic indication of clogging of the filter screen, as well as indicating the oil pressure difference before and after a cleaning process. The timer 8 provides a signal that the time set for engine cleaning has expired.

FIG. 4 illustrates a modified form of the invention wherein an oil tank 48 is connected by a line 46 with a three-way valve 50, and a line 51 extends between the three-way valve 50 and the pump 25. Line 28 is connected with the three-way valve 50, instead of to pump 25 as in the earlier-described embodiment.

During the cleaning process, three-way control valve 50 is opened to pass solution from the tank 3 through three-way valve 50 into pump 25, and thence through cleaning operation.

Upon completion of the cleaning operation, engine drain plug (not shown) is installed and the three-way valve is set to allow flow from oil tank 48 into valve 50 via line 46, and thence into line 51 and pump 25 to the solution container or bowl 11. Motor oil then follows the path earlier described for cleaning solution into the engine via line 1 and adapter 24. After the desired quantity of motor oil has been pumped into the engine, the apparatus is disconnected from the engine. The amount of oil pumped into the engine may be indicated by calibration marks on tank 48 or by an electronic flow meter in line 46. Also, an automatic shut-off device may be installed to shut off pump 25 once the desired quantity of oil has been pumped to the engine.

The oil in the engine is replenished in an efficient and economical manner. Typically in the prior art, several oil containers or cans must be opened and poured into the engine via the engine oil-fill opening, which is time-consuming, and expensive, involving purchasing oil in one-quart containers, whereas with the invention, oil may be purchased in bulk and simply pumped into the engine.

It will be understood that various changes and modifications may be made from the preferred embodiments discussed above without departing from the scope of the present invention, which is established by the following claims and equivalents thereof.

The inventor claims:

1. An engine oil cleaning system, comprising:
   a cleaning solution container having a filter element therein,
   a solution delivery line interconnecting the cleaning solution container and an engine interior,
   means for pumping the cleaning solution via the solution delivery line to the engine interior,
   a solution drain line interconnecting the engine interior and the solution container for conducting oil and cleaning solution pumped by the engine oil pump to the cleaning solution container continuously during an engine cleaning process,
   said cleaning solution container having a removable closure to enable replacement of a used filter element in the container, and
   drainage means on the solution container operable for draining used oil and cleaning solution.

2. A system according to claim 1, wherein said removable closure is a cap threadedly mounted on said solution container for ready removal and replacement of a used filter element.

3. A system according to claim 1, and further comprising:
   a pneumatic valve operable to admit air to the solution container to prevent partial vacuum interfering with drainage therefrom.

4. A system according to claim 1, wherein said filter element is generally tubular with a central passage to receive cleaning solution for passage outwardly via the filter element.

5. A system according to claim 1, wherein said solution container is mounted on a console for convenient viewing and utilization by an operator.

6. A system according to claim 1, and further comprising:
   an operating console having thereon the solution delivery line and an operating valve therefor, the cleaning solution container, a solution pump and control switch therefor, a flowmeter in the solution line between the solution container and the engine, and an air flush control and conduit to direct pressurized air to the engine to remove residual oil and cleaning solution.

7. A system according to claim 1, and further comprising a pressure-responsive device in the solution delivery line to provide diagnostic indication of engine oil pump performance and filter clogging.

8. A system according to claim 1, and further comprising a flow meter in the solution delivery line to provide diagnostic indication of clogging of an engine oil filter screen.

9. A system according to claim 1, and further comprising an exit line connected with the engine interior and the solution drain line to conduct used cleaning solution and oil pumped by the engine oil pump to the solution container.

10. A system according to claim 1, wherein said solution container is a filter bowl and said drainage means comprises a petcock in the lower portion of the filter bowl for draining used solution and oil.

11. A system according to claim 1, wherein said means for pumping cleaning solution via the solution delivery line is a pump in the solution delivery line to pump cleaning solution from the container.

12. A system according to claim 1, and further comprising:
an adapter disposed in an engine oil filter opening, said adapter having a first passage connected with the solution delivery line to admit cleaning solution to the engine, and having a second passage to pass from the engine cleaning solution and oil pumped by the engine oil pump.

13. A system according to claim 1, and further comprising:
an air pressure system for removal of residual oil and cleaning solution from an engine after a cleaning process,
said pressure system including an input connection to a source of pressurized air, and
an air line interconnecting the input connection and the solution delivery line, and a control valve operable to apply pressurized air via the air line to residual cleaning solution and oil in the engine and solution delivery line for enhanced cleaning of the engine oil system.

14. A system according to claim 1, and further comprising an engine oil filling system, including:
an oil supply container,
a conduit line connecting the oil supply container with a control valve, and
means for pumping oil from the oil supply container via said valve to the solution container and thence to the engine via the solution delivery line after an engine is cleaned.

15. An engine oil cleaning system, comprising:
a cleaning solution container having a filter element therein,
a solution delivery line interconnecting the cleaning solution container and an engine interior,
a pump connected with the solution delivery line for pumping cleaning solution via the solution delivery line to the engine interior,
an exit line connected with the engine interior and a solution drain line to conduct used cleaning solution and oil pumped by the engine oil pump to the solution container continuously during an engine cleaning process,
said cleaning solution container having a removable cap for convenient replacement of the used filter element in the container, and
an operating console having thereon said solution container for convenient utilization by an operator, and having thereon the solution delivery line connected with the solution container and said pump for cleaning solution to the solution container, and having thereon a solution drain line connected with a valve to control passage of used cleaning solution and oil through the exit line.

16. A system according to claim 15, and further comprising:
an air pressure system for removal of residual oil and cleaning solution from an engine after a cleaning process,
said pressure system including an input connection to a source of pressurized air, and
an air line interconnecting the input connection and the solution delivery line, and a control valve operable to apply pressurized air via the air line to residual cleaning solution and oil in the engine and solution delivery line for enhanced cleaning of the engine oil system.

17. A system according to claim 15, wherein said solution container is a filter bowl and said valve is a petcock in the lower portion of the filter bowl for draining used solution and oil.

18. A system according to claim 15, and further comprising:
an adapter disposed in an engine oil filter opening, said adapter having a first passage connected with the solution delivery line to admit cleaning solution to the engine, and having a second passage to pass from the engine cleaning solution and oil pumped by the engine oil pump.

19. An engine oil cleaning system, comprising:
a cleaning solution container having a filter element therein,
a solution delivery line interconnecting the cleaning solution container and an engine interior,
means for pumping the cleaning solution via the solution delivery line to the engine interior,
a solution drain line interconnecting the engine interior and the solution container for conducting oil and cleaning solution pumped by the engine oil pump to the cleaning solution container continuously during the engine cleaning process,
said cleaning solution container having a removable closure to enable replacement of a used filter element in the container,
drainage means on the solution container operable for draining used oil and cleaning solution,
an oil supply container,
a conduit line connecting the oil supply container with a control valve, and
means for pumping oil from the oil supply container via said valve to the solution container and thence to the engine via the solution delivery line to supply new oil to the engine after the engine is cleaned.

20. A system according to claim 19, and further comprising:
an air pressure system for removal of residual oil and cleaning solution from an engine after a cleaning process,
said pressure system including an input connection to a source of pressurized air, and
an air line interconnecting the input connection and the solution delivery line, and a control valve operable to apply pressurized air via the air line to residual cleaning solution and oil in the engine and solution delivery line for enhanced cleaning of the engine oil system.

* * * * *